(12) United States Patent
Athsani et al.

(10) Patent No.: US 8,504,587 B2
(45) Date of Patent: Aug. 6, 2013

(54) CONTENT ACCESS AND ANNOTATION SYSTEM AND METHOD

(75) Inventors: Athellina Athsani, San Jose, CA (US); Elizabeth F. Churchill, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 526 days.

(21) Appl. No.: 12/241,337

(22) Filed: Sep. 30, 2008

(65) Prior Publication Data

US 2010/0082677 A1 Apr. 1, 2010

(51) Int. Cl.
*G06F 17/30* (2006.01)
*G06T 1/00* (2006.01)
*H04L 9/32* (2006.01)

(52) U.S. Cl.
USPC .......... 707/783; 707/913; 707/E17.009; 715/230

(58) Field of Classification Search
USPC .......... 707/784, 915, 758, 732, 783, 913
See application file for complete search history.

(56) References Cited

U.S. PATENT DOCUMENTS

| | | | | |
|---|---|---|---|---|
| 7,913,162 | B2* | 3/2011 | Hansen et al. | 715/230 |
| 2007/0130221 | A1* | 6/2007 | Abdo et al. | 707/203 |
| 2007/0143376 | A1* | 6/2007 | McIntosh | 707/205 |
| 2008/0066185 | A1* | 3/2008 | Lester et al. | 726/27 |
| 2008/0187279 | A1* | 8/2008 | Gilley et al. | 386/52 |
| 2009/0249185 | A1* | 10/2009 | Datar et al. | 715/230 |
| 2009/0319885 | A1* | 12/2009 | Amento et al. | 715/230 |

* cited by examiner

*Primary Examiner* — Albert Phillips, III
(74) *Attorney, Agent, or Firm* — James J. DeCarlo; Greenberg Traurig, LLP

(57) ABSTRACT

Disclosed herein are systems and methods for controlling access to content, and/or regions thereof, as well as controlling access to annotations to the content, or regions thereof. An audience can be specified for a region of content and one or more associated annotations. In response to a request for a content region, a content region definition, an audience definition for the content region, and at least one annotation for the content region and audience can be obtained, and the content region and the at least one annotation can be transmitted in response to the request if it is determined that the request is from a member of the audience, so that the content region and annotation can be experienced at an audience member's device.

36 Claims, 7 Drawing Sheets

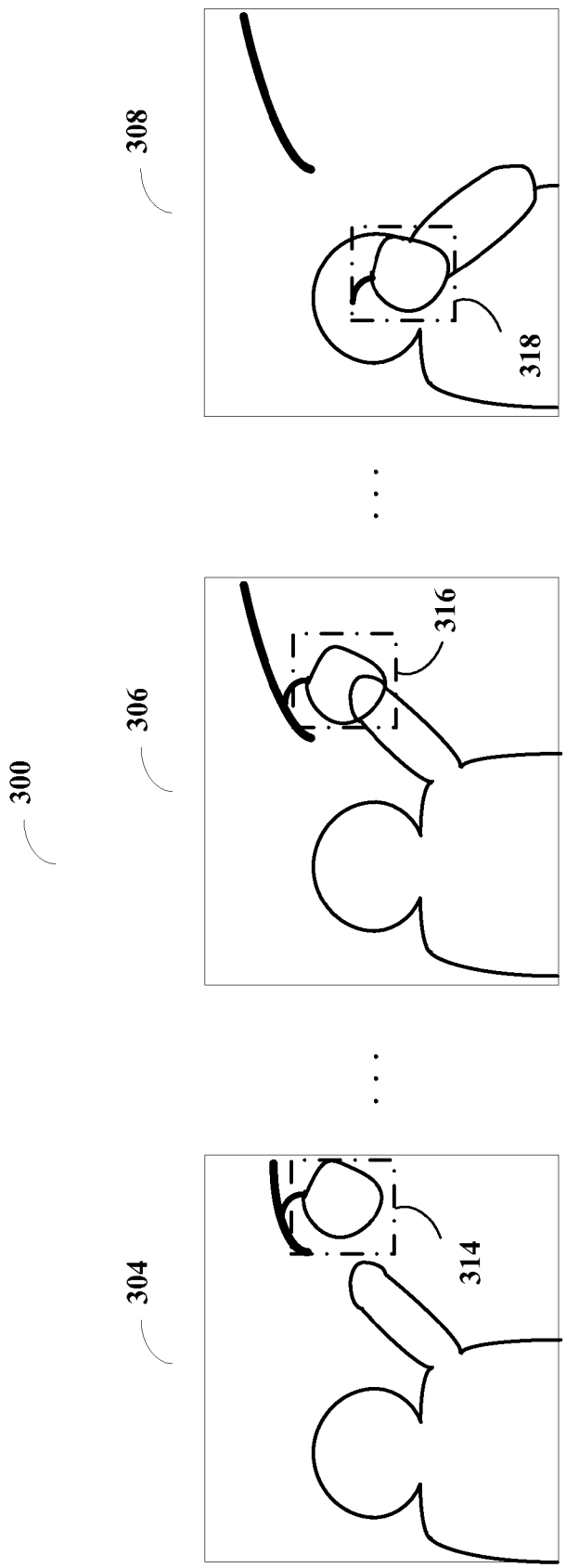

Figure 1:
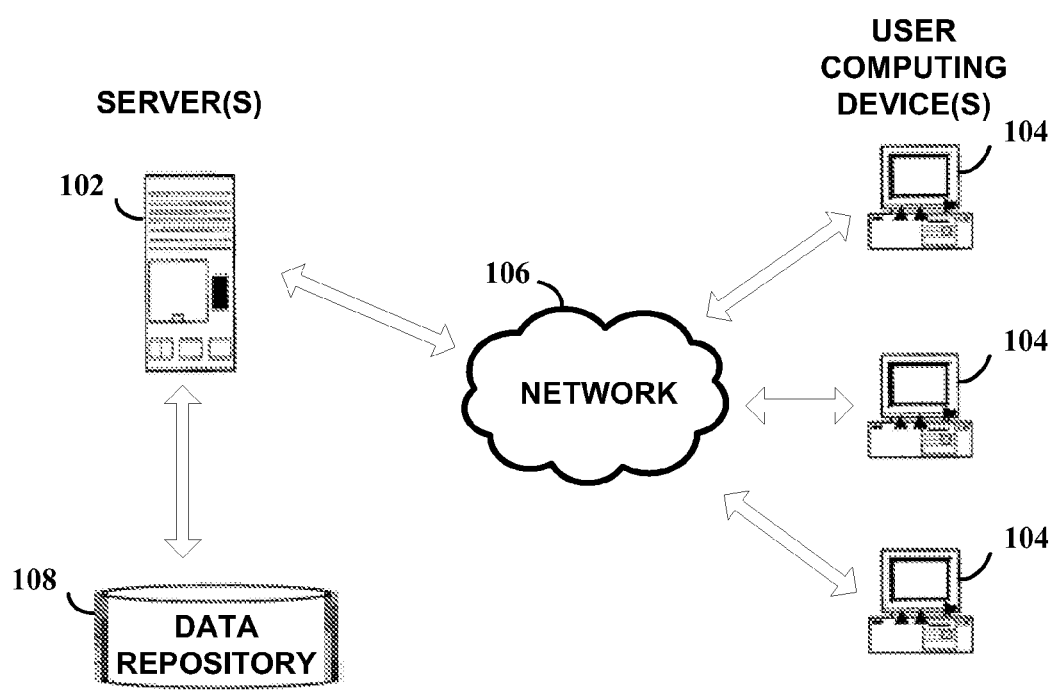

User A: Annotation A
User B: Annotation B
User C: Annotation C

CONTENT ACCESS AND ANNOTATION SYSTEM AND METHOD

FIELD OF THE DISCLOSURE

The present disclosure relates to determining access and/or permissions in connection with content, e.g., user-generated content, and more particularly to using socio-based metadata associated with content and social groups and networks to determine access and/or permissions in connection with content, or a portion or region of the content.

BACKGROUND

Sharing content, such as user generated content has been greatly facilitated by the Internet. In the present disclosure, content can comprise any type of content, including audio, video, multimedia, streaming, image, e.g., a still image, and is commonly in the form of digital data. Conventionally, Internet sites, such as YouTube, Google, Facebook and Flickr, offer content-related applications that allow users to create content, upload content, e.g., user-generated content, to an Internet server, and to share the content with others that access such a site and/or server.

SUMMARY

While it is convenient to be able to share content with others, it would be beneficial to be able to control regions of content to be shared and annotations associated with such content, such that access to regions within the content and associated annotations are provided on a selective basis. The present disclosure seeks to address these and other failings in the art and to provide a system and method of creating and maintaining, and controlling access to, content regions and any annotations associated with a content region. In accordance with one or more embodiments, metadata associated with the content is used to control access to the content. Metadata, or metainformation, refers to "data about data." In the present disclosure, the term metainformation and metadata are used interchangeably.

In accordance with one or more embodiments, metadata associated with content comprises socio-metadata, which comprises one or more annotations associated with a content region, a combination of content region and one or more annotations being accessible by members of at least one audience, e.g., a social group in a social network. Access to a content region and associated annotation(s) can be determined using access control information. By way of a non-limiting example, the access control information can be used to control access to a content region and/or one or more associated annotations, such that the content region and associated annotations can be experienced by members of an audience determined using the access control information. In accordance with one or more embodiments, multiple, different experiences, e.g., views and/or sounds, of the same content can be defined using region information and annotation association(s), and each experience can be selectively made available to an audience using access control information, which can comprise permissions/authorizations associated with the content region(s) and annotation(s).

In accordance with one or more embodiments, a method is provided that comprises receiving a request for a content region, obtaining a content region definition, an audience definition for the content region, and at least one annotation for the content region and audience, and transmitting the content region and the at least one annotation in response to the request if it is determined that the request is from a member of the audience, so that the content region and annotation can be displayed at the audience member's device.

In accordance with one or more embodiments, a system is provided that comprises at least one server to receive a request for a content region, obtain a content region definition, an audience definition for the content region, and at least one annotation for the content region and audience, and transmit the content region and the at least one annotation in response to the request if it is determined that the request is from a member of the audience, so that the content region and annotation can be displayed at the audience member's device.

In accordance with one or more embodiments, a computer-readable medium tangibly embodying program code stored thereon, the medium comprising code to receive a request for a content region, obtain a content region definition, an audience definition for the content region, and at least one annotation for the content region and audience, and transmit the content region and the at least one annotation in response to the request if it is determined that the request is from a member of the audience, so that the content region and annotation can be displayed at the audience member's device.

In accordance with one or more embodiments, a system is provided that comprises one or more computing devices configured to provide functionality in accordance with one or more disclosed embodiments. In accordance with one or more embodiments, functionality is embodied in steps of a method performed by at least one computing device. In accordance with one or more embodiments, program code to implement functionality in accordance with one or more embodiments is embodied in, by and/or on a computer-readable medium that stores the program code.

DRAWINGS

The above-mentioned features and objects of the present disclosure will become more apparent with reference to the following description taken in conjunction with the accompanying drawings wherein like reference numerals denote like elements and in which:

FIG. 1 provides an example of some components that can be used in connection with one or more embodiments of the present disclosure.

Figure 2:
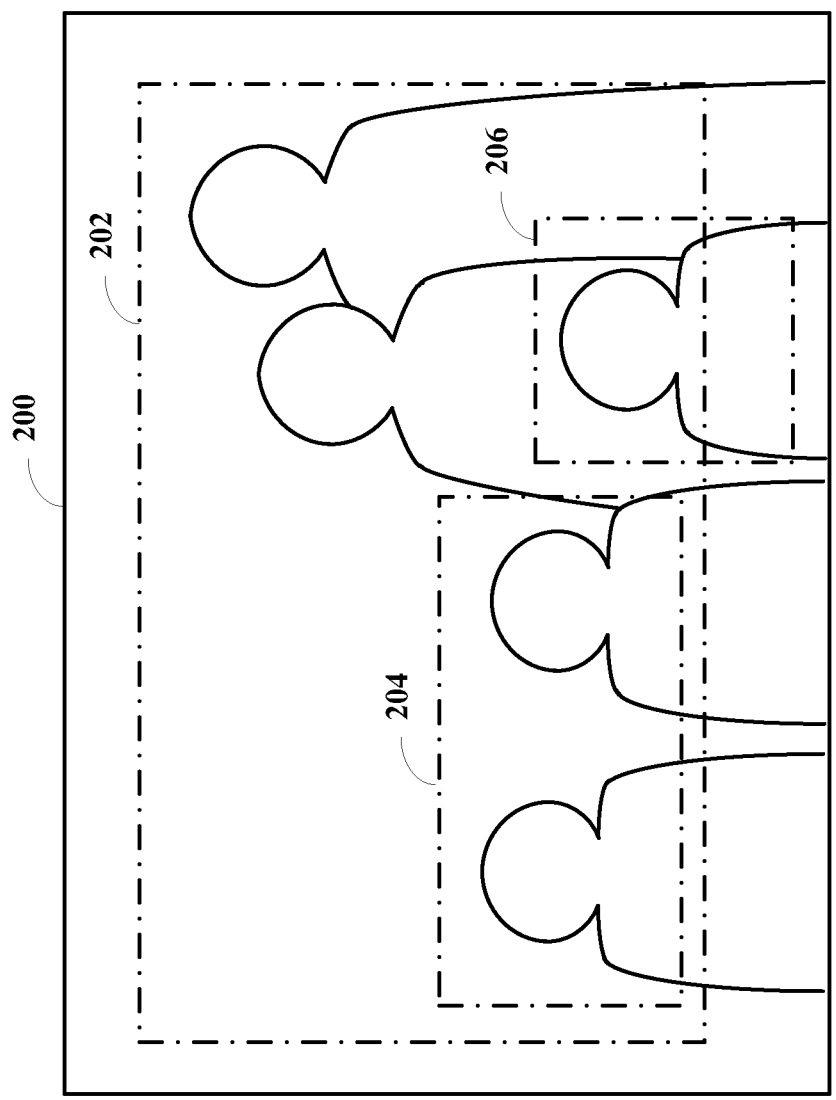

FIG. 2 provides examples of regions of an image defined in accordance with one or more embodiments of the present disclosure.

Figure 3B:
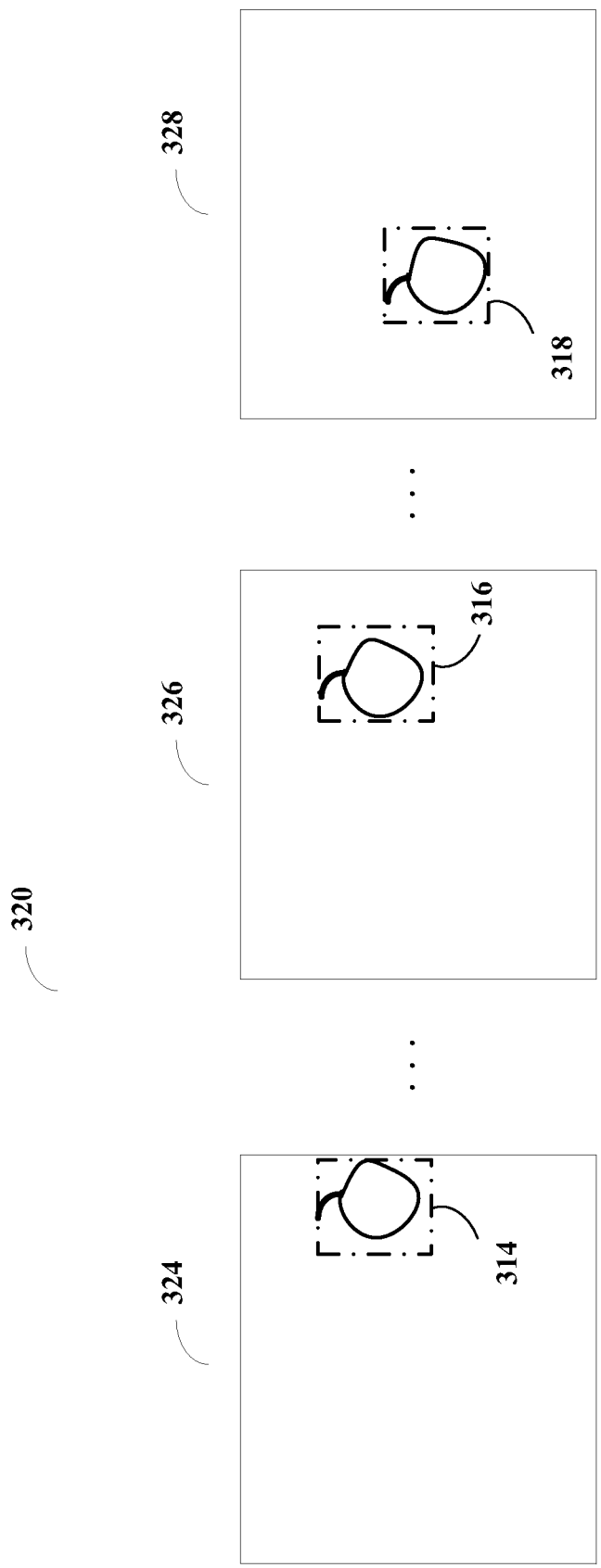

FIG. 3, which comprises FIGS. 3A and 3B, provides an example of a region of a streaming video in accordance with one or more embodiments of the present disclosure.

Figure 4A:
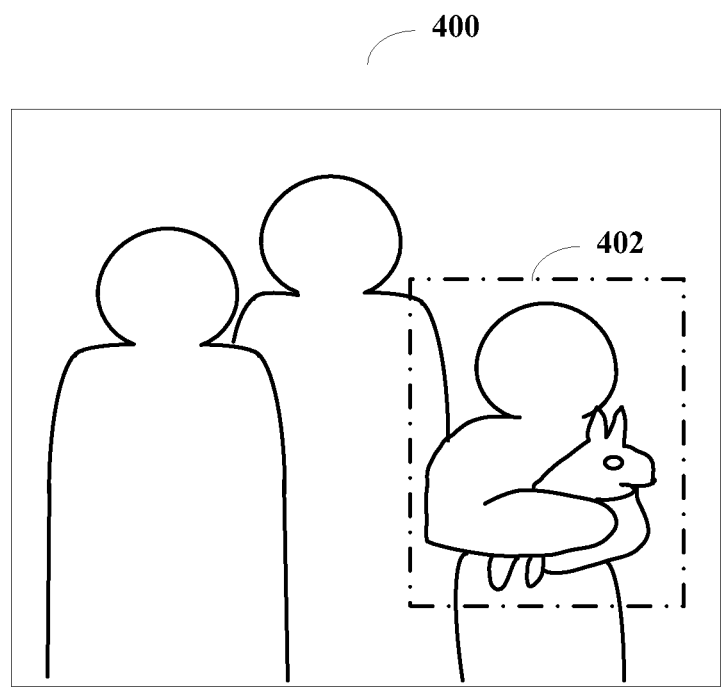
Figure 4B:
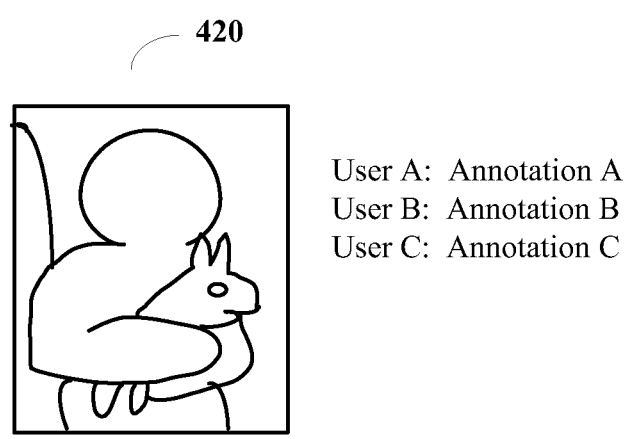

FIG. 4, which comprises FIGS. 4A and 4B, provides another example of a region of a still image in accordance with one or more embodiments of the present disclosure.

Figure 5:
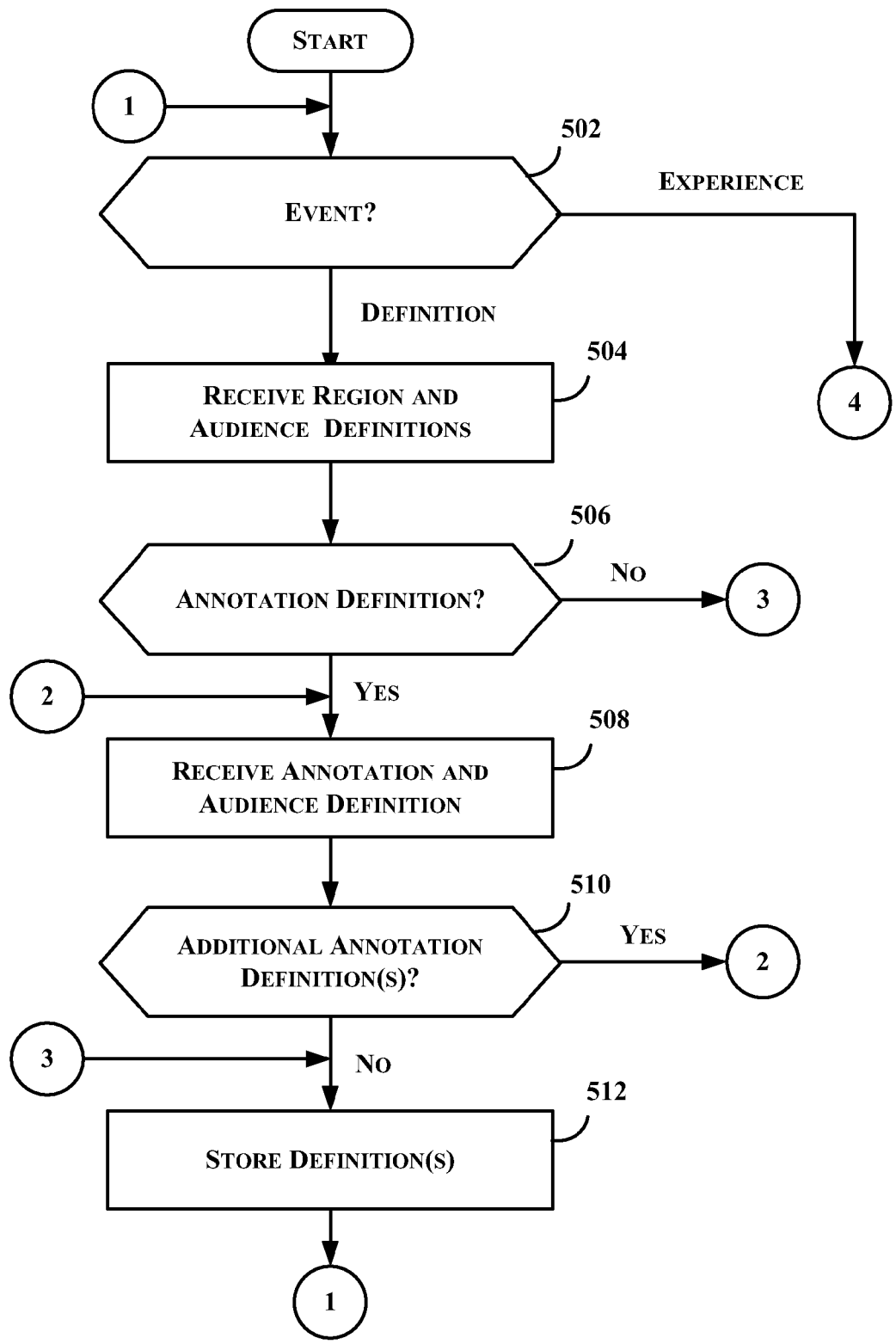

FIG. 5 provides an example of a definition process flow in accordance with one or more embodiments.

Figure 6:
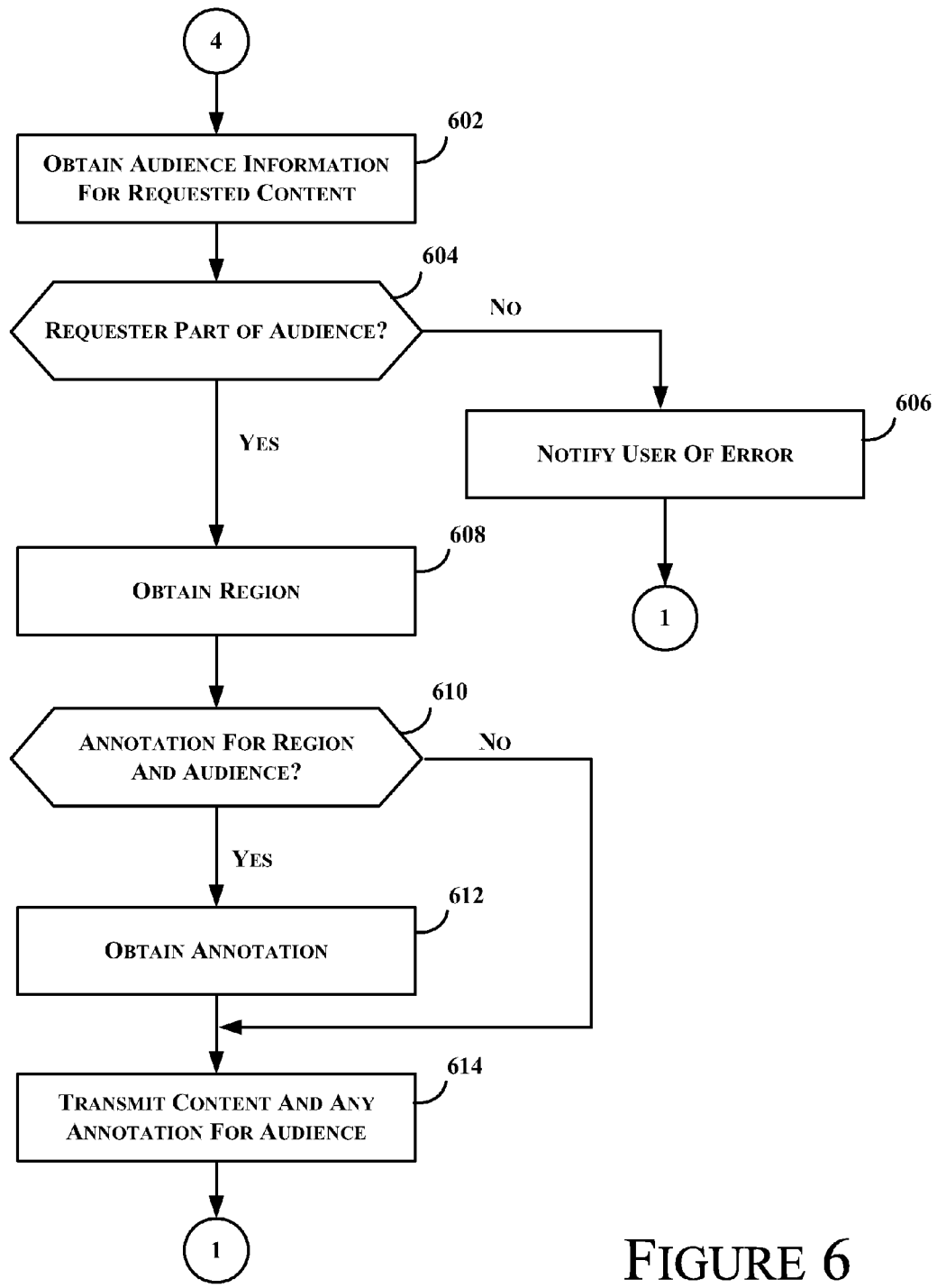

FIG. 6 provides an example of an image serving process flow in accordance with one or more embodiments.

DETAILED DESCRIPTION

In general, the present disclosure includes a socio-based content access system, method and architecture.

Certain embodiments of the present disclosure will now be discussed with reference to the aforementioned figures, wherein like reference numerals refer to like components.

In accordance with one or more embodiments, access to content by one or more user computers is controlled by at least one server, which serves content directly or indirectly to the one or more user computers. FIG. 1 provides an example of some components that can be used in connection with one or more embodiments of the present disclosure. In accordance with one or more embodiments of the present disclosure, one or more computing devices, e.g., one or more servers 102 and user computing devices 104 are configured to include functionality described herein. For example, a server 102 can be configured to receive a request for content from device 104, and determine whether or not to permit access to the content, and in particular to one or more regions of the content, based on access information associated with the content in accordance with one or more embodiments of the present disclosure. In addition, access information can be used to determine accessibility to one or more annotations associated with a content region. The same server 102, or another server 102, can be configured to transmit the content defined by the content region and/or associated annotation(s) determined to be accessible by the user/requester to device 104. The content of a content region can be retrieved from a repository 108, or generated from content retrieved from a repository 108 using a content region definition, and forwarded to device 104 via a network 106, for example, in response to a user request for content. By way of a non-limiting example, server 102 can serve content, e.g., a region of content, to a device 104 via a browser application and a network 106.

Repository 108 can comprise more than one repository. In accordance with one or more embodiments, at least one repository 108 comprises information used to determine whether or not a requester is given access to content. By way of a non-limiting example, such information includes one or more rules associated with a region of content, which rules specify access permission criteria for determining whether or not to permit one or more requesters access to the content, and server 102 retrieves at least one rule from repository 108 in response to a request for content from the requester and device 104. Repository 108 can comprise one or more annotations to a region of content. In accordance with one or more embodiments, a region of content can be original content, a region of the original content, a region of a region of content, etc.

A server 102 is configured to obtain a content region definition, one or more annotations, access control information used to determine content access, and to store the content, content region and annotation definitions, and access control information in repository 108. In accordance with one or more embodiments, other information that stored in repository 108 can comprise user information, e.g., a user that uploads content and/or a user that requests content, a content owner, as well as other "data about data" associated with the content.

Device 104 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. Server 102 and/or device 104 can include one or more processors, memory, a removable media reader, network interface, display and interface, and one or more input devices, e.g., keyboard, keypad, mouse, etc. and input device interface, for example. One skilled in the art will recognize that server 102 and device 104 may be configured in many different ways and implemented using many different combinations of hardware, software, or firmware.

In accordance with one or more embodiments, a server 102 can make a user interface available to a device 104 via the network 106. The user interface made available to the device 104 can include content and annotations determined to be accessible by a user of the device 104 by server 102 in accordance with one or more embodiments of the present invention. In accordance with one or more embodiments, server 102 makes a user interface available to a device 104 by communicating a definition of the user interface to the device 104 via the network 106. The user interface definition can be specified using any of a number of languages, including without limitation a markup language such as Hypertext Markup Language, scripts, applets and the like. The user interface definition can be processed by an application executing on the device 104, such as a browser application, to output the user interface on a display coupled, e.g., a display directly or indirectly connected, to the device 104.

In an embodiment, the network 106 may be the Internet, an intranet (a private version of the Internet), or any other type of network. An intranet is a computer network allowing data transfer between computing devices on the network, and network 106 may comprise personal computers, mainframes, servers, network-enabled hard drives, and any other computing device capable of connecting to other computing devices via an intranet. An intranet typically uses the same Internet protocol suit as the Internet. Two important elements in the suit are the transmission control protocol (TCP) and the Internet protocol (IP).

It should be apparent that embodiments of the present disclosure can be implemented in a client-server environment such as that shown in FIG. 1. Alternatively, embodiments of the present disclosure can be implemented in other environments, e.g., a peer-to-peer environment as one non-limiting example.

In accordance with one or more embodiments, one or more regions of content can be defined, together with one or more annotations. In addition, in accordance with one or more embodiments, access control information can be defined for the content as a whole, for individual content regions and/or annotations, and/or for a collection of content and/or annotations. In accordance with at least one embodiment, socio-metadata is "data about data," i.e., metadata that annotates a region of content, which socio-metadata can be designated for a specified audience that also has access to a region of content to which the socio-metadata is associated. By way of a non-limiting example, a region of content can comprise some or all of the content, one or more objects in the content, etc.

In accordance with one or more embodiments, a socio-based system, and/or method, uses the socio-metadata in connection with social groups and networks of social agents. In accordance with one or more embodiments, a member of a social group or network can be a human agent or a non-human agent, e.g., a software agent, hardware agent, or an agent comprising both hardware and software. In accordance with one or more embodiments, a human agent can identify an object or region of content that is to have controlled access, and associate one or more access controls to the content object/region. In accordance with one or more embodiments, a non-human agent can be configured to recognize an object or region of content that is to have controlled access, determine one or more access controls to bind, or associate, with the recognized object/region. By way of a non-limiting example, a non-human agent can be configured to review image content for faces, and bind the faces recognized in the content with one or more access controls, which identify viewer access permissions associated with the faces recognized in the content. In accordance with one or more embodiments, more than one social agent can be used. By way of a non-limiting example, a first social agent, e.g., a human agent and/or a non-human agent, can identify/recognize the content object(s) and bind the content object(s) to one or more access controls, and a second social agent, e.g., a non-human agent, can be used to determine whether or not to allow access to the content object(s). In accordance with one or more embodiments, the first and second non-human agents can be the same agent. By way of a non-limiting example, the same non-human agent can be used to recognize an object/region that is to have controlled access, identify one or more access controls for the object/region, and control access to the object/region in accordance with the one or more access controls for the object/region. In accordance with one or more embodiments, a non-human agent can be configured to control access to content objects/regions identified by a non-human agent, a human agent, or both. In accordance with one or more embodiments, the non-human agent can be further configured to control access to any annotations associated with the content objects/regions identified by a non-human agent, a human agent, or both. In accordance with one or more embodiments, access rules, or controls, annotations, content regions, content, audience definitions, etc. can be generated by a human agent, a non-human agent, or both.

In accordance with one or more embodiments, region information includes information that can be used to identify a region of content. Region information may vary depending on the type of content. By way of a non-limiting example, region information can comprise boundary information defined by coordinates, pixels, colors, ingredients, shapes, patterns, frequencies, content objects, sound, etc. Region information can be stored with the content. Alternatively, region information can be stored separate from the content. In a case that the region information is stored separately, the region information can include information to identify the content to which the region information is associated. In one embodiment, the socio-metadata can be created by a specified audience.

In accordance with one or more embodiments, boundary information defines a region of content, and access to the content can be limited to the region defined by the boundary information, such that a requester is given access to experience and/or annotate the region of the content defined by the boundary information, together with any annotation associated with the content region that is intended for access by the requester. In accordance with one or more embodiments, a content region can be created from underlying content using boundary information in response to a request for the content, while leaving the underlying content intact, or whole. In accordance with one or more such embodiments, multiple regions and annotations can be defined for the whole content, or a region thereof. By way of a non-limiting example, a content region can be defined, and can have one or more annotations, such that multiple audiences can experience the content region with an annotation specified for each audience, which annotation can differ depending on the audience. By way of a further non-limiting example, multiple content regions can be defined, each having one or more annotations, such that multiple audiences can experience the same or a different content region with the same or a different annotation.

In accordance with one or more embodiments, a content region can be defined and a subsequent content region can be defined from the previously-defined content region. Each region can have an annotation, which can be the same or a different annotation. In accordance with one or more such embodiments, the audience for the subsequently-created region can comprise some or all of the audience members of the previously-defined content region, and/or the audience can comprise different members. In accordance with one or more embodiments, content regions can overlap, with the same annotation, or a different annotation, for each overlapping content region.

By way of a non-limiting example, multiple regions of digital still image content, e.g., a digital photograph, can be defined, each region comprising pixel boundary information and access information to be used to identify an authorized audience, e.g. one or more users. By way of a further non-limiting example, each region has at least one annotation. By virtue of this arrangement, a first audience can experience a first view, or region, of the content defined by the pixel boundaries associated with the first region and an annotation, and a second audience can experience a second region of the same content defined by the pixel boundaries associated with the second region and an annotation associated with the second region. By way of a further non-limiting example, multiple regions of streaming media content, e.g. streaming audio, video, multimedia content, can be defined, each region comprising boundary information, an annotation, and an authorized audience. The boundary information for streaming content can be identified in terms of digital audio/video frames, playback times, frequencies, patterns, etc. A first streaming media audience can experience a first region of the streaming media content defined by boundary information associated with the first region and a first annotation specified for the first audience, and a second audience can experience a second region of the same streaming media content defined by boundary information associated with the second region and a second annotation specified for the second audience. The first and second annotations can be different in whole or in part, or the same in whole or in part.

In accordance with one or more embodiments, content can comprise, without limitation, audio, video, still image, multimedia content. In accordance with one or more embodiments, each content region can be annotated by a content owner and/or a member of the content region's audience. By way of some non-limiting examples, a content region can be annotated with text, metadata, comments, universal resource locators (URLs), descriptions, static or moving images and/or audio, etc. In accordance with one or more embodiments, access control information can be associated with each content region and/or the annotations.

FIG. 2 provides examples of regions of a still image defined in accordance with one or more embodiments of the present disclosure. Regions 202, 204 and 206 can be defined from image 200. In accordance with one or more embodiments, each region can be defined by dragging and sizing a bounding box over the area of image 200 that is to be included in the region. By way of some non-limiting examples, the region can be saved as a set of coordinates, e.g., coordinates of diagonal corners of a square or rectangular region, a coordinate and lengths of one or more sides, etc. By way of another non-limiting example, coordinates can be specified as x and y values, in a two-dimensional image, as pixels, etc. While the regions 202, 204 and 206 are shown as rectangles, it should be apparent that any shape can be used to define a region. In addition and while embodiments are discussed using two-dimensional examples, it should be apparent that a region can be defined in three dimensions as well.

By way of some further non-limiting example, a region can be specified using a URL, color, gradient, pattern, character length, language, vocabulary category, character(s), alphabet(s), number(s), pattern, e.g., audio or video, frequency, e.g., audio or video, object, entity, person, sound, etc.

In accordance with one or more embodiments, an audience can be specified for each of regions 202, 204 and 206. By way of a non-limiting example, an audience can be specified with a set of permissions, such that each member of the audience, e.g., one or more users identified by their user identification information, has access to the content based on the set of permissions. The set of permissions can be used to authorize a member's ability to experience content and/or to generate new content from the existing content. In accordance with one or more embodiments, one or more annotations can be specified for each of regions 202, 204 and 206, and an audience can be specified for each of the annotations. A set of permissions, which can be the same or different form the permission set associated with the content, can be used to establish whether a user is authorized an annotation.

By way of some non-limiting examples, region 202 can include images of co-workers and can be annotated with a message intended for the co-workers, region 204 can include images of friends intended for other friends that are not co-workers and can be annotated with a message intended for the other friends, and region 206 can include an image of a user that can be annotated with a message intended for the user's parents. In accordance with one or more embodiments, one or more of regions 202, 204 and 206 can include more than one annotation, each with an audience. By way of a non-limiting example, region 202 can have a second annotation that comprises a message to the user's parents, e.g., the user that created region 206. The second annotation associated with region 202 and intended for the user's parents can be different from the annotation associated with region 202 that is intended for the co-workers.

In accordance with one or more embodiments, region 204 can be created from image 200 or from region 202. By way of a non-limiting example, region 204 can be a mashup of region 202. In accordance with one or more such embodiments, region 204 can be created by someone other than the user that created region 202. By way of a non-limited example, the user that creates region 204 from region 202 is a member of the audience specified for region 202. In accordance with one or more embodiments, an owner can be specified for the image contained in region 202, and an owner can be specified for the image contained in region 204, and each owner can control their respective images. The owner of content, e.g., the owner of image 200, can elect to retain ultimate control over image 200 and each of the images created from image 200. By way of a non-limiting, control can be assigned in a hierarchical manner, with the owner of the content from which other content is created can retain absolute and/or ultimate control, and have the ability to specify the level of autonomy and control given to an owner of an image created from image 200. The owner of image 200 can elect to prohibit new mashups from being created, elect to place no restrictions on creation of mashups, or some other level of control, for example.

A visual annotation can be displayed within a region, partially within the region, or outside the region, for example. By way of a non-limiting example, an annotation can be displayed when the region is displayed, or it can be displayed after the region is displayed. In accordance with one or more embodiments, an annotation can be any piece of information that can annotate content. As such, an annotation can comprise, without limitation, content, such as audio, video, multimedia content, still image, graphics, animation, logo, thumbnail, etc. An audio annotation can be played while content that is being annotated is being displayed, in the case of visual content, or played while the content is being played, in the case of audio content. Other types of annotation, in addition to aural, e.g., sound, voice, music, and visual, e.g., touch, smell, are also contemplated.

FIG. 3, which comprises FIGS. 3A and 3B, provides an example of a region of a streaming video in accordance with one or more embodiments of the present disclosure. Referring to FIG. 3A, a video stream 300 comprises frames 304, 306 and 308, which are part of a sequence of frames of the video stream 300. Each frame 304, 306 and 308 include an object, i.e., an apple, which is located in regions 314, 316 and 318, respectively, each of which is illustratively shown using a dash-lined box. As can be seen from the example, regions 314, 316 and 316 is at a different location in each of frames 304, 306 and 308. In accordance with one or more embodiments, the object is tracked from one frame to the next, so that the object can be displayed in its location in the frame.

One audience, which comprises one or more users, can have permission to view a region which comprises the entire image provided in each of frames 304, 306 and 308, and another audience, which comprises one or more users, can have permission to view the regions 314, 316 and 318 of frames 304, 306 and 308, respectively. The first audience would be able to experience the frames in video stream 300 shown in FIG. 3A, for example. The second audience would experience the video stream 320, which comprises frames 324, 326 and 328 in the sequence as shown in FIG. 3B. With reference to FIG. 3B, the second audience would see only the apple contained in regions 324, 326 and 328 of video stream 320.

In accordance with one or more embodiments, the video stream 300 can have a first URL, which identifies the location of the video content file, and the name of the content file, e.g., domain-name and video-stream-filename. In accordance with one or more embodiment, the video stream 320 can be identified using the same identification of the underlying video stream file. In addition, the URL used for video stream 320 can identify each region 314, 316 and 318 using frame identification information, e.g., playback time, frame number, etc., and region identification information, e.g., coordinates of the region within the frame, e.g., domain name, video-stream-filename, regionID, frameID, such that each region 314, 316 and 318 has a different URL.

FIG. 4, which comprises FIGS. 4A and 4B, provides another example of a region of a still image in accordance with one or more embodiments of the present disclosure. In accordance with one or more embodiments, an image such as that shown in region 402 of image 400 can have multiple annotations. Image 420, which can be generated from a definition of region 402, can be annotated using "Annotation A" for a first user, User A, annotated with "Annotation B" for a second user, User B, and annotated with "Annotation C" for a third user, User C, etc. By way of a non-limiting example, a URL can be used to identify image 420, e.g., as a stored image or with reference to the original image 400 and a region definition, and a reference to the annotation that is to be used given the user that is to view the image 420. By way of a further non-limiting example, in a case that the annotation is a visual annotation, the visual annotation can be displayed with image 420, e.g., within region 402, or it can be displayed when the user moves the mouse over a displayed image 420. In accordance with one or more embodiments, a region, such as region 402, can be specified as a Hypertext Markup Language (HTML) hotspot, using anchor tag(s).

In accordance with one or more embodiments, a server, e.g., server 102, is configured to receive input to define a region, an audience for the defined region, an annotation, and an audience for the annotation. FIG. 5 provides an example of a definition process flow in accordance with one or more embodiments. In accordance with one or more such embodiments, server 102 is further configured to receive a request from a user for a region. FIG. 6 provides an example of an image serving process flow in accordance with one or more embodiments.

With reference to FIG. 5, at step 502, server 102 receives input, e.g., input from a user using device 104. In accordance with one or more embodiments, input is received from a user registered with the system, which system is provided by one or more servers 102. A determination is made at step 502 whether or not the input is definition input, or a request to experience content. If the input is a request to experience content, processing continues at step 602 of FIG. 6. If the input comprises a request to define a region and/or an annotation, processing continues at step 504 of FIG. 5.

Referring again to FIG. 5, at step 504, server 102 receives definition information. The definition information can be received from a user using device 104. By way of a non-limiting example, the user can use a browser and an application such as that provided by YouTube, Flickr, Facebook, etc. to define new content, e.g., an image, streaming content, etc. In accordance with one or more embodiments, methods of the present disclosure can interact with a site, e.g., one of the indicated site examples, as a plug-in, e.g., a browser plug-in, as a standalone uploader/editor or as something that is integral to the application, e.g., a site application. The definition input received at step 504 can comprise a region definition and an audience for the region. In accordance with one or more embodiments, if no audience input is received at step 504, the audience can be assumed to be all registered users.

In accordance with one or more embodiments, an audience, e.g., a content region and/or annotation audience, can be specified in a number of ways. By way of a non-limiting example, the user that creates content can create an audience and select the users that are to be members of the audience. The audience creator can select from a list of registered users, a list of registered users that are part of the creator's address book, a list of previously-created audiences, a list of users defined for a previously-created audience, etc. By way of a further non-limiting example, server 102 can automatically identify an audience for the content created using pre-established affiliations of the creator and/or a determination made using previously-established express and/or implicit preferences and/or observations made by the system about the user, e.g., using known affiliations, activities, online browsing history, etc. collected by the system for the user. Automatic identification of an audience by the system can be based on the content that is created and/or other metadata associated with the content. By way of a non-limiting example, metadata associated with the content that identifies that the content is a photograph of a location identified, e.g., using global positioning satellite metadata and address information, as the content creator's house, can be used to automatically identify the content's audience as the creator's family and close friends.

At step 506, a determination is made whether or not an annotation is input for a region. If not, processing continues at step 512 to store the region definition, and associated audience definition, if one is received for the region. If an annotation is received, processing continues at step 508 to receive the annotation input, together with any audience specification for the received annotation. Processing continues at step 510 to determine whether additional annotations are received. If so, processing continues at step 508 to receive/process the additional annotation, and associated audience input, if any.

If it is determined, at step 510, that there is no more additional annotation, processing continues at step 512 to store the region definition, as well as any annotation and audience definitions.

The process shown in FIG. 5 can be invoked after content is provided by server 102 to user device 104. The content that is provided by server 102 can be content region, e.g., a region of other content, defined using a process such as that shown in FIG. 5. In accordance with one or more embodiments, server 102 can comprise more than one server, and the processes of FIGS. 5 and 6 can be performed by one or more instances of server 102.

If server 102 determines, at step 502, that the input is a request to experience content, e.g., an image, or other content, processing continues at step 602 of FIG. 6 to process the request. At step 602, audience information for the requested content is retrieved. By way of a non-limiting example, audience information can be retrieved using a unique identifier for the requested content received as part of the content request. A determination is made at step 604 whether or not the requester is a part of the audience permitted to experience the requested content. In accordance with one or more embodiments, the requester is considered to be a part of the audience in a case that no audience information is obtained at step 602, e.g., there is no audience information associated with the requested content, or the requester is owner of the content requested. A requester can be determined to be a member of the audience by comparing user identification information, userID, included with the input request with user identification information identifying user members of the audience. If the userID received with the request corresponds to a userID of an audience member, the requester is considered to be a member of the audience. If the requester is determined to not be a member of the audience, processing continues at step 606 to notify the user that the requested content is not available.

If the requester is determined to be a member of the audience for the requested content, processing continues at step 608 to obtain the region of the content identified using the content identifier included with the request. In a case that the content identifier points to stored content, the content is retrieved at step 608. In a case that the content identifier points to stored content and further identifies a region within the stored content, the region is obtained, at step 608, by retrieving the stored content and "clipping" the portion of the content outside the region. In accordance with one or more embodiments, the request can include a region identifier, which can be used to retrieve stored region information. In accordance with one or more alternate embodiments, the request can include the region information. In accordance with one or more embodiments, the clipping comprises a socio-based clipping, e.g., clipping based on social groups and/or networks, and/or layers of social groups and/or networks.

At step 610, a determination is made whether or not an annotation exists for the requested content. By way of a non-limiting example, the request can include annotation identification information, which can be used to retrieve the annotation from storage. By way of another non-limiting example, the request can include the annotation. By way of another non-limiting example, the content identifier and/or the audience identifier can be used to identify an annotation associated with both the content and the content audience. If it is determined that there is an annotation for the requested content and associated audience, processing continues at step

612 to obtain the annotation, and processing continues at step 614. If it is determined at step 610 that there is no annotation, processing continues at step 614. At step 614, server 102 transmits the requested content, and any annotation, to the requester device 104.

In accordance with one or more embodiments, a region can have more than one audience and/or a user can be a member of more than one audience. In any case, it is possible that more than one annotation can be associated with a content region and user, so that more than one annotation can be obtained at step 612 and transmitted with the content at step 614.

In accordance with one or more embodiments, a region within content can be recognized using search criteria and a search tool. More particular, search criteria, e.g., digital search criteria, such as a digital audio or video pattern, etc., is input with the content to the search tool. The search tool uses the search criteria to locate the region. In accordance with one or more embodiments, the search tool can be a pattern recognition tool, e.g., an optical character recognition tool for characters, etc., configured to recognize a pattern defined by the search criteria in the content. In a case that the content and the search criteria are textual, the search tool can be configured to search for the text specified in the search criteria in the content.

In accordance with one or more embodiments, an annotation associated with a content region can be used to discern information about the requester. The discerned information can be used by server 102 to identify one or more advertisements to be presented to a user, e.g., the requester and/or the user that is creating the content region, audience, annotation, etc. In accordance with one or more embodiments, annotation associated with content can be used to facilitate an Internet search.

One or more embodiments of the present disclosure can be used as part of, or with, a content rights management system or tool. By way of a non-limiting example, the audience and/or permissions associated with a content region can be used to determine whether or not to grant access to the content.

In accordance with one or more embodiments, a member of an audience associated with a content region is given permission to experience the content by virtue of being a member of the audience. Other permissions can be assigned to the content region. For example, members of the audience can be restricted with respect to the number of times, e.g., over a given period of time, that the audience as a whole, or on a per member basis, experiences the content. Other restrictions can take into account, without limitation, an amount of time since the content was last experienced, a time of day, month and/or year during which the content can be experienced, etc.

By way of a further non-limiting example, as discussed herein, permissions can be associated with content creation and/or annotation, and such associated permissions can limit the degree to which content can be generated created and/or annotated. For example, an owner of original content, or an owner of a content region created from the original content, can restrict content creation and/or annotation to certain users, limit the type of annotations, e.g., restrict use of profanity and other material that might be offensive.

By way of another non-limiting example, restrictions set by a content owner, either the original or a content region owner, can be inherited, such that any content created from content that has restrictions inherits the restrictions.

In accordance with one or more embodiments, an automated or batch process can be used to identify a content region, and/or redact/remove content outside the content region. By way of a non-limiting example, the automated/batch process can be configured to identify a region of content in initial content, e.g., original content or content generated from the original content, and to redact/remove any portion of the initial content that is outside the identified region. By way of a non-limiting example, the initial content can be a video that comprises both video and sound, e.g., one or more voices, soundtracks, etc. A redaction tool can be configured to redact soundtrack(s), for example, from the initial content for an audience, e.g., people in a contacts group. In this example, the content region is defined to be the video portion of the content, and the soundtrack(s) is/are determined to be outside the content region. By way of a further non-limiting example, the redaction tool can be configured to selectively redact based on the audience and a content region associated with the audience, such that the soundtrack(s) are removed from the initial content for one audience, e.g., people in a group of contacts other than family members, and are left in the initial content, i.e., not removed, for an audience of family members. In the former case, the content region for the audience of contacts other than family members is defined to be the video portion of the content, and in the latter case, the content region for the audience of family members is defined to be both the video and the soundtrack(s).

In accordance with one or more embodiments, content can comprise a content aggregate, e.g., multiple discrete pieces of content. In accordance with one or more embodiments, a content region can be defined for a content aggregate, and pieces of content in a content aggregate can be determined to be within or outside a content region. In the above example, the content aggregate can be defined to be both the video and soundtrack(s), and a content region that is defined to be the video portion of the content aggregate can be used to redact the soundtrack content. In accordance with one or more embodiments, two or more content pieces in a content aggregate can be associated such that if one content piece in the aggregate is determined to be outside a content region, each of the content pieces associated with the determined content piece is also considered to be outside the content region. Conversely, if a content piece in the aggregate is determined to be within a content region, each of the content pieces associated with the determined content piece is considered to be within the content region. In accordance with one or more embodiments, a content piece in a content aggregate can be an annotation that is associated with another content piece in the aggregate. In accordance with the at least one embodiment, redaction can be performed such that an annotation associated with a content piece that is redacted is also redacted. Conversely, in accordance with one or more embodiments, redaction can be performed such that an annotation associated with a content piece that is not redacted is also not redacted.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   receiving, by at least one server computer, a request for a region of content from a requester, the request having an associated user identifier of the requester;
   obtaining, by the at least one server computer in response to the request, an audience definition for the content region;
   determining, by the at least one server computer, that the requester is a member of the audience using the audience definition and the user identifier;
   in response to the request from the requester determined to be an audience member, the at least one server computer:
      obtaining a content region definition for the content region, the content region definition comprising boundary information for the content region;
      obtaining the content region using the content and the content region definition;
      obtaining at least one annotation for the content region and the content region's audience, each annotation providing annotation for the content region; and
      transmitting the content region and the at least one annotation, so that the content region and the at least one annotation can be experienced at the audience member's device.

2. A method according to claim 1, further comprising:
   creating, by the at least one server computer, the content region definition in response to an audience definition request.

3. A method according to claim 1, further comprising:
   creating, by the at least one server computer, the content region definition in response to an annotation creation request.

4. A method according to claim 1, further comprising:
   creating, by the at least one server computer, the content region definition in response to a content creation request.

5. A method according to claim 4, further comprising:
   generating, by the at least one server computer, the audience definition using information received from a content creation requester that identifies one or more members of the audience for the content region.

6. A method according to claim 4, further comprising:
   generating, by the at least one server computer, the audience definition by identifying one or more members of the audience based on information known about a content creation requester.

7. A method according to claim 4, further comprising:
   generating, by the at least one server computer, the audience definition using one or more of information about a content creation requester, nature of the content being created, context of the at least one annotation, and a category of the at least one annotation.

8. A method according to claim 4, wherein the content region is a subsequent content region created from a previously-created content region, the previously-created content region and the subsequent content region are regions of original content.

9. A method according to claim 8, wherein the original content has an owner, creating the content region definition further comprising:
   creating the content region definition for the subsequent content region in a case that it is permitted by the owner of the original content.

10. A method according to claim 8, wherein both the previously-created content region and the original content have an owner, creating the content region definition further comprising:
    creating the content region definition for the subsequent content region in a case that it is permitted by both the owner of the previously-created content region and the owner of the original content.

11. A method according to claim 1, wherein the content region has multiple annotations, each annotation having an audience, the method further comprising:
    identifying, by the at least one server computer, at least one audience to which a requester of the content region is a member; and
    selecting, by the at least one server computer, one or more annotations from the multiple annotations, each annotation selected corresponding to an identified audience.

12. A method according to claim 1, wherein at least one criteria for permission in addition to audience membership is associated with the content region, transmitting the content region further comprising:
    transmitting the content region and the at least one annotation in response to the request if it is determined that the request is from a member of the audience and that the at least one criteria for permission is satisfied, so that the content region and annotation can be experienced at the audience member's device.

13. A system comprising:
at least one server having at least one processor for executing and memory for storing instructions, the server:
receiving a request for a region of content from a requester, the request having an associated user identifier of the requester;
obtaining, in response to the request, an audience definition for the content region;
determining that the requester is a member of the audience using the audience definition and the user identifier;
in response to the request from the requester determined to be an audience member:
obtaining a content region definition for the content region;
obtaining the content region using the content and the content region definition, the content region definition comprising boundary information for the content region;
obtaining at least one annotation for the content region and the content region's audience, each annotation providing annotation for the content region; and
transmitting the content region and the at least one annotation, so that the content region and the at least one annotation can be experienced at the audience member's device.

14. A system according to claim 13, the at least one server further:
creating the content region definition in response to an audience definition request.

15. A system according to claim 13, the at least one server further:
creating the content region definition in response to an annotation creation request.

16. A system according to claim 13, the at least one server further:
creating the content region definition in response to a content creation request.

17. A system according to claim 16, the at least one server further:
generating the audience definition using information received from a content creation requester that identifies one or more members of the audience for the content region.

18. A system according to claim 16, the at least one server further:
generating the audience definition by identifying one or more members of the audience based on information known about a content creation requester.

19. A system according to claim 16, the at least one server further:
generating the audience definition using one or more of information about a content creation requester, nature of the content being created, context of the at least one annotation, and a category of the at least one annotation.

20. A system according to claim 16, wherein the content region is a subsequent content region created from a previously-created content region, the previously-created content region and the subsequent content region are regions of original content.

21. A system according to claim 20, wherein the original content has an owner, creating the content region definition by the at least one server further comprising:
creating the content region definition for the subsequent content region in a case that it is permitted by the owner of the original content.

22. A system according to claim 20, wherein both the previously-created content region and the original content have an owner, creating the content region definition by the at least one server further comprising:
creating the content region definition for the subsequent content region in a case that it is permitted by both the owner of the previously-created content region and the owner of the original content.

23. A system according to claim 13, wherein the content region has multiple annotations, each annotation having an audience, the at least one server further:
identifying at least one audience to which a requester of the content region is a member; and
selecting one or more annotations from the multiple annotations, each annotation selected corresponding to an identified audience.

24. A system according to claim 13, wherein at least one criteria for permission in addition to audience membership is associated with the content region, transmitting the content region by the at least one server further comprising:
transmitting the content region and the at least one annotation in response to the request if it is determined that the request is from a member of the audience and that the at least one criteria for permission is satisfied, so that the content region and annotation can be experienced at the audience member's device.

25. A non-transitory computer-readable medium tangibly embodying program code stored thereon, when executed the program code causes at least one server computer to:
receive a request for a region of content from a requester, the request having an associated user identifier of the requester;
obtain, in response to the request, an audience definition for the content region;
determine that the requester is a member of the audience using the audience definition and the user identifier;
in response to the request from the requester determined to be an audience member:
obtain a content region definition for the content region, the content region definition comprising boundary information for the content region;
obtain the content region using the content and the content region definition;
obtain at least one annotation for the content region and the content region's audience, each annotation providing annotation for the content region; and
transmit the content region and the at least one annotation, so that the content region and the at least one annotation can be experienced at the audience member's device.

26. A non-transitory medium according to claim 25, the program code further comprising program code that when executed causes the at least one server computer to:
create the content region definition in response to an audience definition request.

27. A non-transitory medium according to claim 25, the program code further comprising program code that when executed causes the at least one server computer to:
create the content region definition in response to an annotation creation request.

28. A non-transitory medium according to claim 25, the program code further comprising program code that when executed causes the at least one server computer to:
create the content region definition in response to a content creation request.

29. A non-transitory medium according to claim 28, the program code further comprising program code that when executed causes the at least one server computer to:
generate the audience definition using information received from a content creation requester that identifies one or more members of the audience for the content region.

30. A non-transitory medium according to claim 28, the program code further comprising program code that when executed causes the at least one server computer to:
generate the audience definition by identifying one or more members of the audience based on information known about a content creation requester.

31. A non-transitory medium according to claim 28, the program code further comprising program code that when executed causes the at least one server computer to:
generate the audience definition using one or more of information about a content creation requester, nature of the content being created, context of the at least one annotation, and a category of the at least one annotation.

32. A non-transitory medium according to claim 28, wherein the content region is a subsequent content region created from a previously-created content region, the previously-created content region and the subsequent content region are regions of original content.

33. A non-transitory medium according to claim 32, wherein the original content has an owner, the program code to create the content region definition further comprising program code that when executed causes the at least one server computer to:
create the content region definition for the subsequent content region in a case that it is permitted by the owner of the original content.

34. A non-transitory medium according to claim 32, wherein both the previously-created content region and the original content have an owner, the program code to create the content region definition further comprising program code that when executed causes the at least one server computer to:
create the content region definition for the subsequent content region in a case that it is permitted by both the owner of the previously-created content region and the owner of the original content.

35. A non-transitory medium according to claim 25, wherein the content region has multiple annotations, each annotation having an audience, the program code further comprising program code that when executed causes the at least one server computer to:
identify at least one audience to which a requester of the content region is a member; and
select one or more annotations from the multiple annotations, each annotation selected corresponding to an identified audience.

36. A non-transitory medium according to claim 25, wherein at least one criteria for permission in addition to audience membership is associated with the content region, the program code to transmit the content region further comprising program code that when executed causes the at least one server computer to:
transmit the content region and the at least one annotation in response to the request if it is determined that the request is from a member of the audience and that the at least one criteria for permission is satisfied, so that the content region and annotation can be experienced at the audience member's device.

* * * * *